US010677734B2

(12) United States Patent
Tuunanen et al.

(10) Patent No.: US 10,677,734 B2
(45) Date of Patent: Jun. 9, 2020

(54) METHOD AND APPARATUS FOR OPTICAL MEASUREMENT OF LIQUID SAMPLE

(71) Applicant: Thermo Fisher Scientific Oy, Vantaa (FI)

(72) Inventors: Jukka Tuunanen, Helsinki (FI); Sauli Porttila, Tuusula (FI); Matti Sairanen, Vantaa (FI); Tuomo Von Lerber, Helsinki (FI); Jorma Lampinen, Vantaa (FI); Timo Karmeniemi, Helsinki (FI)

(73) Assignee: Thermo Fisher Scientific Oy, Vantaa (FI)

( * ) Notice: Subject to any disclaimer, the term of this patent is extended or adjusted under 35 U.S.C. 154(b) by 35 days.

(21) Appl. No.: 15/505,486

(22) PCT Filed: Sep. 3, 2015

(86) PCT No.: PCT/FI2015/050578
§ 371 (c)(1),
(2) Date: Feb. 21, 2017

(87) PCT Pub. No.: WO2016/034775
PCT Pub. Date: Mar. 10, 2016

(65) Prior Publication Data
US 2017/0254756 A1 Sep. 7, 2017

(30) Foreign Application Priority Data

Sep. 5, 2014 (FI) .................................... 20145774
Dec. 17, 2014 (FI) .................................... 20146110

(51) Int. Cl.
*G01N 21/76* (2006.01)
*G01N 1/28* (2006.01)
(Continued)

(52) U.S. Cl.
CPC ............... *G01N 21/76* (2013.01); *G01N 1/28* (2013.01); *G01N 21/01* (2013.01); *G01N 21/63* (2013.01);
(Continued)

(58) Field of Classification Search
USPC ....................................................... 73/861.1
See application file for complete search history.

(56) References Cited

U.S. PATENT DOCUMENTS 6,097,025 A * 8/2000 Modlin ................ G01N 21/253
250/205
6,339,472 B1 * 1/2002 Hafeman .................. G01J 3/08
356/433

(Continued)

FOREIGN PATENT DOCUMENTS

CN 1301357 A 6/2001
CN 1771429 A 5/2006
(Continued)

OTHER PUBLICATIONS

Ullman, Edwin F. et al., Luminescent oxygen channeling assay (LOCITM): sensitive, broadly applicable homogeneous immunoassay method, Clinical Chemistry, American Association for Clinical Chemistry, Washington, DC, vol. 42, No. 9, 1996, pp. 1518-1526, XP002109518, Issn: 0009-9147.
(Continued)

*Primary Examiner* — Peter J Macchiarolo
*Assistant Examiner* — Mohammed E Keramet-Amircolai
(74) *Attorney, Agent, or Firm* — Wood Herron & Evans LLP

(57) ABSTRACT

A method and an apparatus for optical measurement of a liquid sample placed in a sample well where the sample in the sample well is exposed to excitation light at first wavelength from an excitation light source, which excitation light
(Continued)

generates a collection of singlet state oxygen molecules from donor molecules in the liquid sample, said singlet state oxygen molecules reacting with acceptor molecules in the liquid sample causing said acceptor molecules to emit chemiluminescence emission light at second wavelength, which second wavelength is shorter than said first wavelength, and where the emission light produced by the excitation light is measured with a detector, characterized in that the excitation light source is a LED.

23 Claims, 6 Drawing Sheets

(51) Int. Cl.
    *G01N 21/01*     (2006.01)
    *G01N 21/63*     (2006.01)
    *G01N 21/64*     (2006.01)

(52) U.S. Cl.
    CPC ... *G01N 21/6408* (2013.01); *G01N 2201/062* (2013.01)

(56) References Cited

U.S. PATENT DOCUMENTS

| | | | |
|---|---|---|---|
| 6,406,913 B1* | 6/2002 | Ullman | C07D 265/30 435/41 |
| 6,563,584 B1* | 5/2003 | Yurino | G01N 21/6452 356/417 |
| 2002/0037149 A1* | 3/2002 | Chen | G01N 21/645 385/147 |
| 2003/0062485 A1* | 4/2003 | Fernandez | G01N 21/274 250/458.1 |
| 2004/0081621 A1* | 4/2004 | Arndt | A61B 5/0059 424/9.6 |
| 2005/0062969 A1* | 3/2005 | Harju | G01N 21/6452 356/417 |
| 2006/0121602 A1* | 6/2006 | Hoshizaki | G01N 21/645 435/288.7 |
| 2006/0227319 A1* | 10/2006 | Imura | G01N 21/64 356/256 |
| 2008/0179539 A1* | 7/2008 | Rasnow | G01N 21/6454 250/458.1 |
| 2011/0278472 A1* | 11/2011 | Atzler | G01J 3/0291 250/459.1 |
| 2012/0002960 A1* | 1/2012 | Laitinen | G01N 21/6452 398/25 |
| 2012/0025715 A1* | 2/2012 | Picciotto | H05B 47/11 315/152 |
| 2018/0074074 A1* | 3/2018 | Luloh | B01L 3/502 |
| 2018/0356411 A1* | 12/2018 | Albrecht | G01N 33/5008 |

FOREIGN PATENT DOCUMENTS

| | | |
|---|---|---|
| CN | 101514962 A | 8/2009 |
| CN | 102292924 | 12/2011 |
| CN | 202126403 U | 1/2012 |
| CN | 102714904 A | 10/2012 |
| DE | 102013207479 B3 | 10/2014 |
| EP | 1163497 A1 | 12/2001 |
| EP | 1486770 A1 | 12/2004 |
| JP | H11311603 A | 11/1999 |
| WO | 9947963 A1 | 9/1999 |
| WO | 0050860 A1 | 8/2000 |
| WO | 0214838 A2 | 2/2002 |
| WO | 2006027406 A1 | 3/2006 |
| WO | 2008104637 A1 | 9/2008 |
| WO | 2008152204 A1 | 12/2008 |
| WO | 2009056669 A1 | 5/2009 |
| WO | 2013163129 A1 | 10/2013 |
| WO | 2014173836 A1 | 10/2014 |

OTHER PUBLICATIONS

European Patent Office, Extended European Search Report, Application No. 15838441.2, dated Apr. 26, 2018 (12 pages).
Perkinelmer Life and Analytical Sciences, A Practical Guide to Working With AlphaScreen, published 2004 (60 pages).
European Patent Office, English Machine Translation of DE102013207479B3, dated Oct. 2, 2014, translated on Sep. 14, 2015 (54 pages).
Finnish Patent and Registration Office, Office Action, Application No. 20145774, dated Apr. 29, 2015 (6 pages).
Finnish Patent and Registration Office, Office Action, Application No. 20146110, dated Jun. 17, 2015 (6 pages).
Finnish Patent and Registration Office, International Search Report and Written Opinion of the International Searching Authority, International Application No. PCT/FI2015/050578, dated Dec. 10, 2015 (15 pages).
Roger Bosse et al., AlphaScreen Application Note ASC-001, Principles of AlphaScreen(TM), Amplified Luminescent Proximity Homogenous Assay, PerkinElmer Life Sciences, Inc., dated 2002 (8 pages).
European Patent Office, Office Action, Application No. 15 838 441.2, dated Feb. 25, 2019 (8 pages).
Patent Office of the People's Republic of China, Office Action, Application No. 201580047404.9, dated Sep. 12, 2018 (13 pages).
Patent Office of the People's Republic of China, Translation of the Office Action, Application No. 201580047404.9, dated Sep. 12, 2018 (18 pages).
Chinese National Intellectual Property Administration, Rejection Decision, Application No. 201580047404.9, dated Mar. 5, 2020 (10 pages).

* cited by examiner

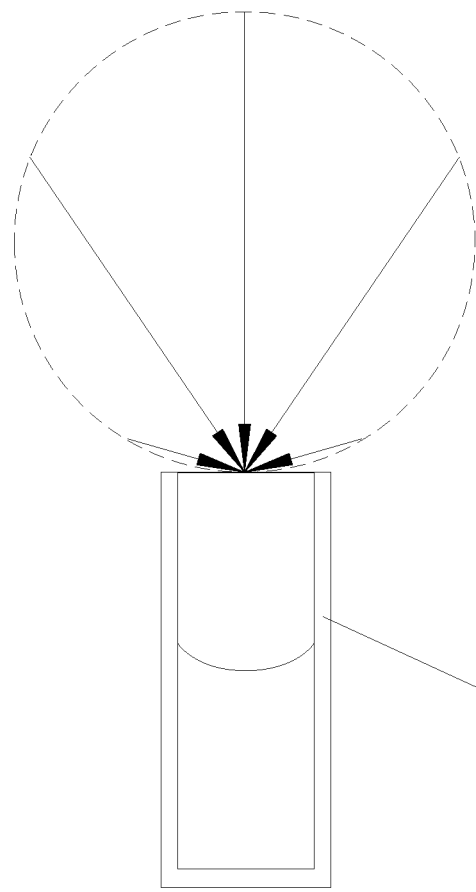 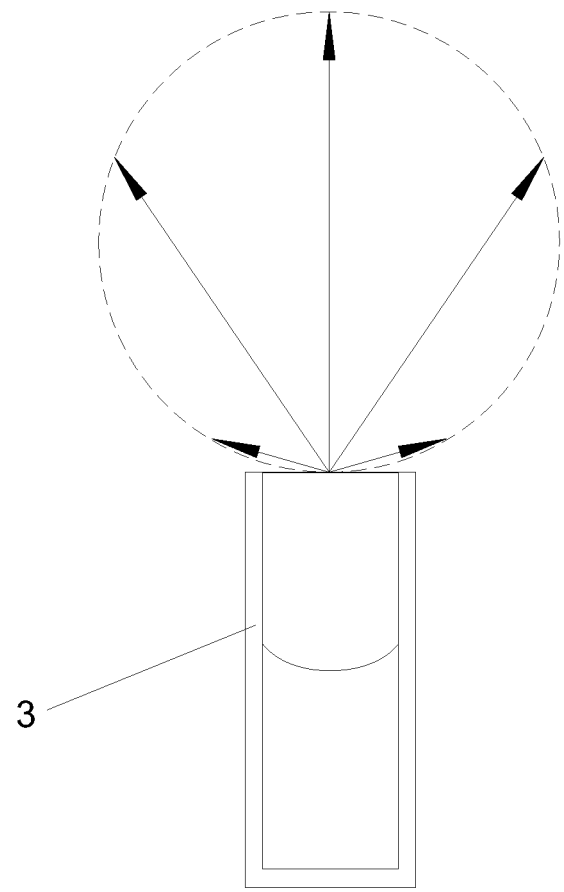
FIG. 2A                    FIG. 2B

METHOD AND APPARATUS FOR OPTICAL MEASUREMENT OF LIQUID SAMPLE

CROSS-REFERENCE TO RELATED APPLICATIONS

This application is a submission under 35 U.S.C. § 371 of International Application No. PCT/FI2015/050578, filed Sep. 3, 2015, which claims priority to Finnish Application No. 20145774, filed Sep. 5, 2014 and to Finnish Application No. 20146110, filed Dec. 17, 2014, the disclosures of which are hereby expressly incorporated by reference herein in their entireties.

FIELD OF THE INVENTION

The present invention relates to optical measurement of liquid samples. More precisely, the present invention relates to a method and an apparatus for optical measurement of a liquid sample placed in a sample well where the sample in the sample well is exposed to excitation light from an excitation light source and where the emission of light produced by the excitation of light is measured with a detector.

BACKGROUND OF THE INVENTION

Fluorescence in the emission of light (a photon) by a substance that has absorbed light or other electromagnetic radiation. Absorbance of energy excites an orbital electron of a molecule to higher electronic states and relaxation to ground state emits a photon. It is a form of luminescence. Usually, the emitted light has a longer wavelength, and therefore lower energy, than the absorbed radiation.

Chemiluminescence is the emission of light (luminescence), as the result of a chemical reaction.

Fluorophores absorb light energy at one wavelength and, in response, re-emit light energy at another, longer wavelength. Each fluorophore has a distinctive range of wavelengths at which it absorbs light and another distinct range of wavelengths at which it emits light. This property enables their use for specific detection of biological products by analytical instruments and techniques.

Different sample measuring methods based on photoluminescence are known from prior art, wherein emission of light from the sample is obtained with an excitation of light into the sample. When the light emitted by the sample is measured, different properties of the sample can be determined. Known measurement methods include AlphaScreen (Amplified Luminescent Proximity Homogeneous Assay Screen) photochemical measurement technology and LOCI (Luminescent Oxygen Channeling Immunoassay) described in U.S. Pat. No. 6,406,913 to Ullman et al., where an emission of light is produced both by excitation of light and by a chemical reaction within the sample.

The light source generally used in AlphaScreen measurement technology method and devices is a laser due to the uniformity of the wavelength of the light produced and the obtained high power density of the light, which high excitation energy effectively causes formation of modified oxygen molecules from beads coated with a luminescent agent. The modified oxygen molecules ultimately initiate a cascade of chemical reactions leading to the generation of the detected chemiluminescent signal.

The AlphaScreen measurement method is a bead-based proximity assay, where Donor beads and Acceptor beads connect through various biological analyte material, which may specifically react with each other and the beads. When the connected Donor beads are excited with a red laser light at 670-690 nm wavelength, they convert ambient oxygen to an excited singlet state. The released singlets of oxygen diffuses to the surrounding sample well matrix and if the Donor and Acceptor beads are connected via the specific biological reaction to be examined, the Acceptor beads are near enough to be excited by the singlets and a light emission is produced between 520-620 nm wavelength, which is a blue-green, green or yellow light and is proportional to the level of interaction. By measuring the emission light, it is possible to establish how effectively the chemical reaction has taken place and what are the properties of the sample being assayed.

The difference in wavelengths between the excitation light and emission light from the sample allows separation and detection of the emitted light from the excitation light.

In the AlphaScreen method, the wavelengths of excitation light and emission light have a reverse relationship compared to fluorescence in general, i.e., excitation light wavelength is longer than the emission light wavelength.

In fluorescence measurement generally, an excitation light impulse is sent to the sample, and measurement of the emission light is carried out effectively without induced delays. In Time-Resolved Fluorescence spectroscopy (TRF), the sample is monitored as a function of time after excitation light pulse or pulses. TRF is utilized to reduce background fluorescence and, for example, in kinetic studies.

Laser is potentially a precise and powerful light source that usually generates a collimated light beam which reduces the need to use separate collimating means in the analytical instrument but the use of a laser as an excitation light source also causes some problems. The high electrical power needed to produce the laser light also generates heat but, since the laser diode's resonators are highly sensitive to self-generated heat and temperature variations, the laser diode requires often active cooling by a separate device, such as a Peltier cooler, which results in added complexity and size of the analytical device. Further, laser diodes are also very expensive, which raises the price of the analytical devices utilizing lasers. In practice, it has been observed that only a few measurements, typically only one, can be performed when the sample is excited with a laser light source in, e.g., AlphaScreen applications because strongly reduced or no emission signal is gained in the subsequent measurements.

Fluorescence reading instruments can be stabilized by using suitable stable fluorescence reference material which converts shorter wavelength excitation radiation to longer wavelength emission radiation. These kinds of materials are widely available and are used, for example, in Thermo Scientific's Fluoroskan Ascent microplate fluorometers.

In Alphascreen measurement, the excitation wavelength (685 nm) is longer than the emission wavelength (520 nm-620 nm). There are no suitable stabile materials available which would convert the excitation wavelength of 685 nm to shorter wavelengths. This is problematic, since the shifting towards shorter wavelengths is in fact one of the benefits of Alphascreen measurement, since no optical background signal is present in the measurement. Also, the used reference materials cannot be used as a reference fluorescence material in TRF measurements, including Alphascreen chemistry, due to lack of TRF behavior.

SUMMARY OF THE INVENTION

The present invention provides a novel method and apparatus for optical measurement of liquid samples when the excitation light generates singlet oxygen, which in turn causes emission of chemiluminescence light such that the wavelength of the excitation light is longer than the wavelength of the observed chemiluminescence emission light.

The method and apparatus may be used for optical measurement of liquid samples, e.g., for utilizing fluorescent AlphaScreen or other singlet oxygen channeling assay based chemistries, such as in AlphaScreen, AlphaLISA and similar optical measurement methods. The singlet oxygen channeling assays may mean assays, which are based on chemiluminescence caused by singlet oxygen, and where the wavelength of the excitation light is longer than the wavelength of the observed chemiluminescence emission light.

The excitation light source may be a LED (Light-Emitting Diode). With the use of a LED, the same optical power as with a semiconductor laser can be obtained without the problems caused to the quality of the excitation light by temperature variations whereas a laser diode may be affected by a temperature shift of even single degree of Celsius. The use of a LED also allows for more compact construction of the measuring device.

Main advantage of the use of a LED as an excitation light source in the AlphaScreen or other singlet oxygen channeling assay based chemistry applications, however, is that the emission of the measured sample does not diminish the same way than in the measurement with laser, which means that the same sample may be excited and measured several, at least two, times at different time points (kinetic studies). Kinetic measurements are typically used to study various enzymatic reactions. Examples of kinetic experiments, where the same sample is measured multiple times at set time points during the course of a chemical reaction to monitor the reaction chemistry kinetics, are described in Example 1 and FIGS. 5A-5C.

In the present invention, the TRF measurement may be carried out with single excitation exposure and single emission reading after suitable time period, for example, 300 ms exposure, 50 ms delay, and 500 ms emission reading. Alternatively, the TRF measurement may be carried out with a plurality of continuous measurement cycles within a desired measurement time, wherein a short excitation pulse is followed with a short emission measurement, for example, 10 ms excitation and emission reading cycle, consisting of 5 ms excitation followed with 5 ms emission reading, is continuously repeated over the desired measurement time.

When the amount of background is reduced, the instrument becomes more sensitive and lower analyte concentrations can be detected more reliably.

The problem of background production can be reduced many ways. The instrument hardware may be designed to reduce background but, for example, filters are not usually 100% accurate as some excitation light may be passed through emission filters and vice versa. Background emission is exhausted after a certain period of time. In TRF, excitation light is not illuminated at the same time as emission is read and at the time of reading most of the back-ground emission has also already deceased. Also, in AlphaScreen or other singlet oxygen channeling assay based technologies emission wavelength is shorter than excitation wavelength which means that background fluorescence signal, which is longer than excitation wavelength, is not read at the same wavelength are as the sample emission. Using confocal optical arrangement also reduces the amount of background signal generated by minimizing illumination on other parts than the sample liquid.

In a method of the present invention for optical measurement of a liquid sample placed in a sample well, the sample in the sample well is exposed to excitation light at a first wavelength from an excitation light source, which excitation light generates a collection of singlet state oxygen molecules from donor molecules in the liquid sample, said singlet state oxygen molecules reacting with acceptor molecules in the liquid sample causing said acceptor molecules to emit chemiluminescence emission light at a second wavelength, which second wavelength is shorter than said first wavelength, and where the emission light produced by the excitation light is measured with a detector, wherein the excitation light source is a LED.

In an embodiment of the method of the present invention, excitation light from the LED is focused on the area of the opening of the sample well, and the emission light is collected from the area of the opening of the sample well with confocal arrangement. This embodiment provides for efficient and uniform illumination of the samples and highly sensitive measurement results.

In the context of the present invention, the use of the term "confocal" means that the focus point of excitation light and the focus point for collection of emission light are effectively the one and same focus point of the arrangement and the optical path of the emission light share at least one common optical element, such as a lens, a mirror, or a beam splitter.

In an embodiment of the method of the present invention, excitation light is guided into the sample well and the emission light is collected from the sample well in confocal arrangement, where the image of the excitation light source is focused on the top of the opening of the sample well, and the image of the light receiving area of the detector is focused on top of the opening of the sample well. In this embodiment, said image of the excitation light source may be smaller than the opening of the sample well, and said image of the light receiving area of the detector may be larger than the opening of the sample well.

In an embodiment of the method of the present invention, an excitation light impulse is sent to the sample, and the measurement of emission light is carried out after a predefined time period has passed from the sending of the excitation light impulse. The predefined time period may be 30-70 ms, typically 50 ms, for example.

In an embodiment of the method of the present invention, the excitation light and emission light are calibrated. This calibration is preferably carried out with separate and independent calibration processes.

In an embodiment of the method of the present invention, the used LED emits light at the wavelength of 680 nm.

In an embodiment of the method of the present invention, the inner walls of the sample well are formed of or coated with diffusely reflecting material. Such inner walls of the well provide good diffuse reflection surfaces for both the excitation light and emission light, which improves the quality of the measurement process. An example of suitable material is polystyrene with white color substance, e.g., titanium oxide.

An apparatus of the present invention for optical measurement of a liquid sample placed in a sample well comprises an excitation light source for exposing the sample in the sample well to excitation light at a first wavelength, and a detector for detecting and measuring chemiluminescence emission light at a second wavelength from the sample, which second wavelength is shorter than said first wavelength, wherein the excitation light source is a LED.

In an embodiment of the apparatus of the present invention, the apparatus comprises focusing devices for focusing the image of the excitation light source in the area of the opening of the sample well, and devices for focusing the image of the light receiving area of the detector in the area of the opening of the sample well, where the confocal point is effectively at the level of the opening of the sample well.

In an embodiment of the apparatus of the present invention, the excitation light source is an impulse excitation light source.

In an embodiment of the apparatus of the present invention, the apparatus also comprises an excitation light filter, an emission light filter, excitation and emission light beam splitter, and a stray light shield above the sample well.

In an embodiment of the apparatus of the present invention, the apparatus also comprises an excitation light beam splitter and an excitation reference detector for calibrating the excitation light, and/or emission reference light source and a white reflective scattering surface for calibrating the emission detector.

In an embodiment of the apparatus of the present invention, the excitation LED is a LED emitting light at the wavelength of 680 nm.

In an embodiment of the apparatus of the present invention, the detector is a photomultiplier tube.

The features defining a method of the present invention are more precisely stated in claim 1, and the features defining an apparatus of the present invention are more precisely stated in claim 17. Dependent claims disclose advantageous features and embodiments of the present invention.

BRIEF DESCRIPTION OF THE DRAWINGS

In the following examples, several embodiments will be described in more detail with reference to the appended drawings, in which:

FIGS. 2A and 2B show schematically, by way of example, excitation and emission patterns obtained with the present invention.

DETAILED DESCRIPTION OF THE INVENTION

Figure 1:
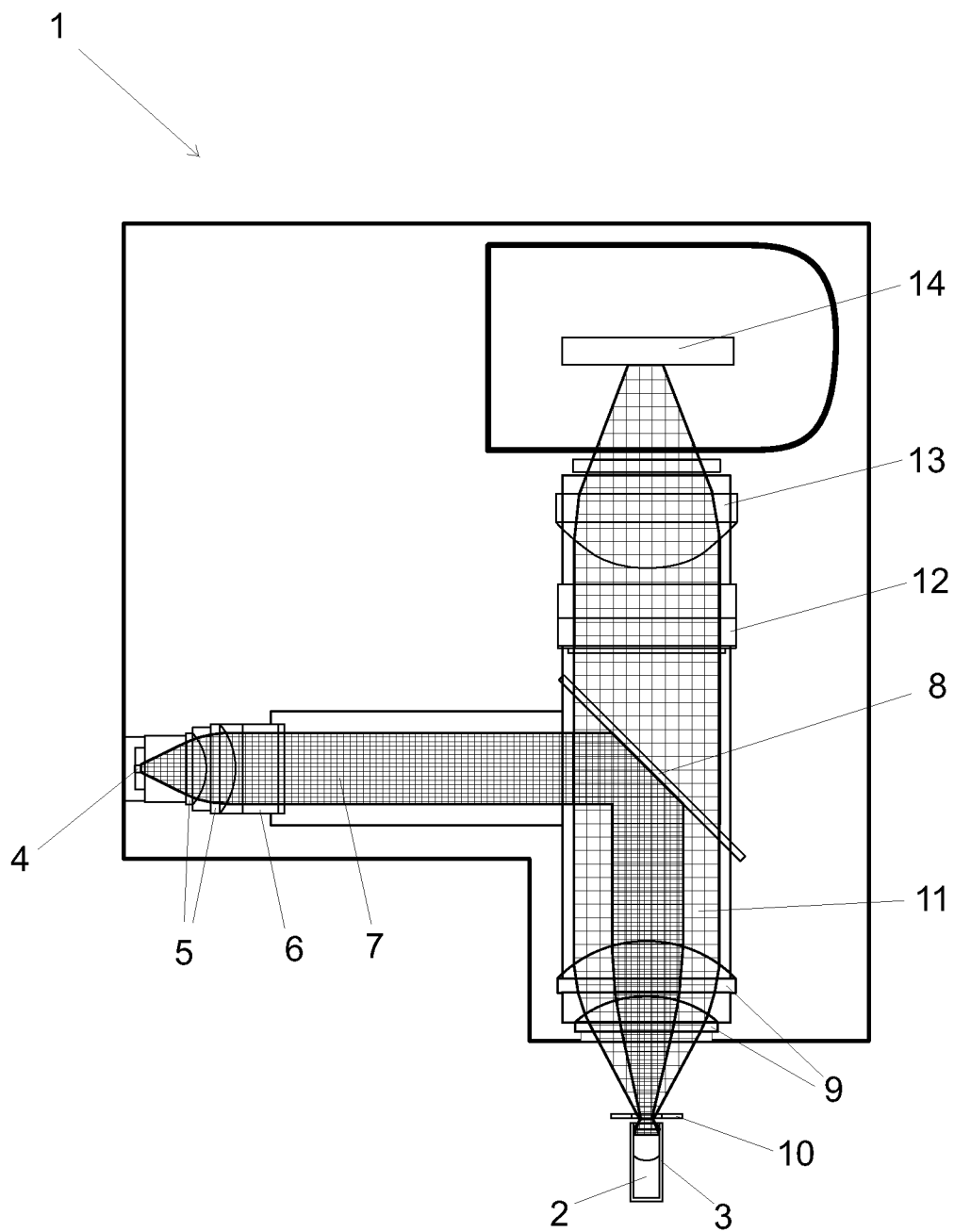
FIG. 1 shows schematically, by way of example, a measuring arrangement in accordance with the present invention.

The measuring arrangement shown schematically in FIG. 1 for implementing suitable singlet oxygen channeling assay based measurement technology applications, such as AlphaScreen or AlphaLISA, for example, comprises an optical measuring device 1 of the present invention during optical measurement of a liquid sample 2 located in a sample well 3, which sample well can be a part of a 384 microwell plate, for example.

The optical measuring device 1 comprises a LED 4 forming the excitation light source of the device with a lens arrangement 5 and a filter 6. The LED 4 emits light at wavelength of 680 nm, which light is collected to a light beam with the lens arrangement 5 and filtered with the filter 6 to guarantee the proper wavelength of the thus obtained excitation light beam 7.

The excitation light beam 7 is then reflected towards the sample well 3 with a beam splitter 8 which reflects light at a wavelength of 680 nm. Before exiting the measuring device 1, the excitation light beam 7 is focused with a lens arrangement 9 so, that the focus point of the excitation light beam is in the area of the opening of the sample well 3.

When the excitation light beam 7 is focused in the area of the opening of the sample well 3, the inner surface of which sample well is white, the sample well behaves like an Ulbricht integrating sphere, and effectively lights the whole liquid sample 2 located inside the sample well. This is discussed more closely later with reference to FIGS. 2A and 2B.

The emission light obtained from the liquid sample 2 with the excitation light beam 7 is collected from the same confocal focus point than to where the excitation light beam was focused in the area of the opening of the sample well 3. Closely above the opening of the sample well 3 is located a crosstalk shield 10 with an aperture, which minimizes possible excitation light from neighboring wells by optical stray lights.

The collected emission light from the liquid sample 2 is directed to an emission light beam 11, which typically has a wavelength of 520 nm-620 nm. These wavelengths are not reflected by the beam splitter 8 and pass through it. The beam splitter 8 can also be partially reflective broadband mirror, which is useful when free wavelength selection is needed. The emission light beam 11 is filtered with a filter 12 and focused with a lens 13 on a detection surface of a detector component 14, which is in this embodiment a cathode of a photomultiplier tube.

With the measuring device 1 of FIG. 1, the excitation beam 7 may be generated and sent simultaneously with the collection and measuring of the emission signal beam 11, due to the beam splitter 8, but preferably an excitation light beam is generated as an impulse or impulses and the collection and measurement of the emission signal is carried out after a predefined time has passed from sending the impulse (a TRF measurement).

FIGS. 2A and 2B show schematically excitation and emission patterns obtained with the present invention. FIG. 2A shows the excitation acceptance pattern according to Lambert's cosine law and FIG. 2B shows the emission radiation pattern according to Lambert's cosine law.

A white microwell 3, or a microwell with white inner surface, behaves like an Ulbricht integrating sphere. Opening on the Ulbricht integrating sphere behaves like an ideally diffuse radiating surface and thus obeys Lambert's cosine law. The radiation pattern is a circle on top of the opening of the well 3. The opening behaves identically both when receiving radiation (excitation) and when transmitting radiation (emission).

By placing an excitation confocal point just on the opening of the well 3, maximum solid angle can be used for excitation, and by placing an emission confocal point on the opening of the well, maximum solid angle can be used for emission reading.

When fitting collimated light beam to the opening of the well 3, very short focal length optics can be used. This means that magnification of the LED output can be kept low and the focused image of the LED at the plate opening is smaller than the dimensions of the opening. This leads to high excitation efficiency. Further, since the LED image on the opening is smaller than the dimensions of the opening, well position is not critical.

Excitation beam is completely smoothed inside the well 3 giving gentle illumination for the interior of the well.

Particles and liquid content are uniformly illuminated from above, below and sides. This minimizes the risk of many bleaching effects.

In emission reading the same very short focal length lens is used to imagine the opening of the well 3 to conform first collimated beam through the interference filter and then the emission beam is focused on the cathode of the photomultiplier tube. The short focal length lens can collect light from the opening of the well 3 in very large angle, which produces a high emission collection efficiency. And, since the image of the opening of the well is smaller than the cathode of the photomultiplier tube, well positioning is not critical.

An additional light shield may be used to minimize excitation of neighboring wells by optical stray lights. The same light shield also minimizes emission crosstalk in emission reading. Combined stray light shielding can be 1:10000, for example.

Figure 3:
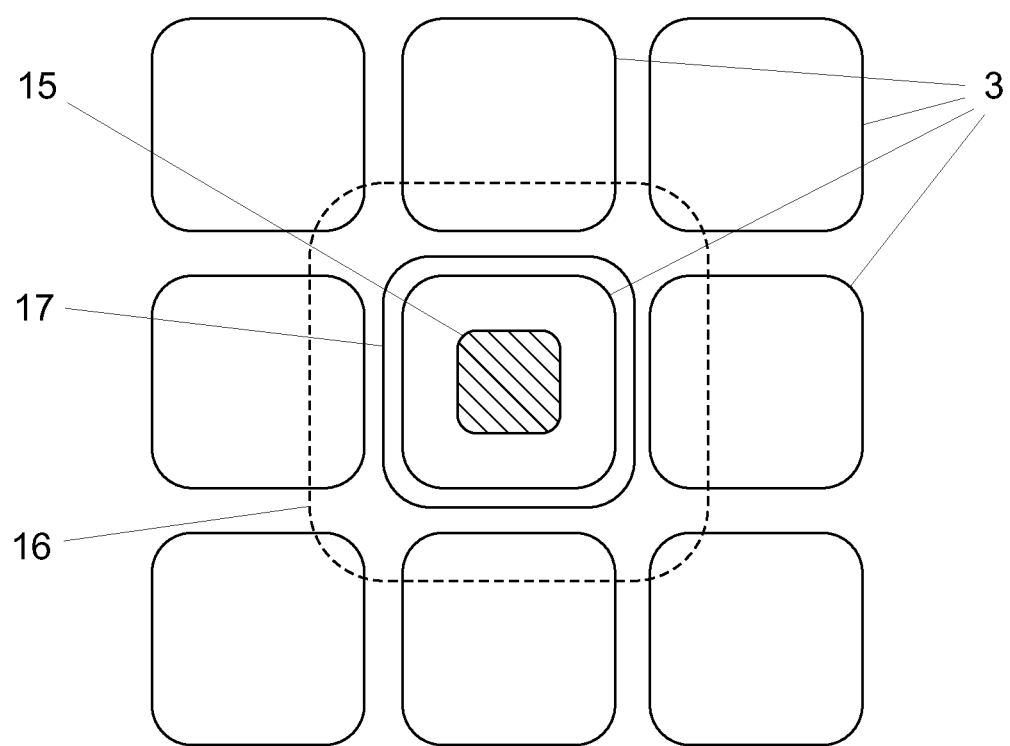
FIG. 3 illustrates schematically, by way of example, the images used in the present invention.

FIG. 3 illustrates schematically the images used with the present invention. In FIG. 3 is shown an image 15 of the excitation light LED 4 over the opening of the well 3, which well is a part of well plate comprising a plurality of wells 3. The image 16 of the cathode 14 of the photomultiplier tube is large compared to the opening area of the well 3. Use of a crosstalk shield 10, the opening 17 of which is slightly larger than the opening of the well 3, effectively prevents neighboring wells to leak emission to the cathode 14.

Figure 4:
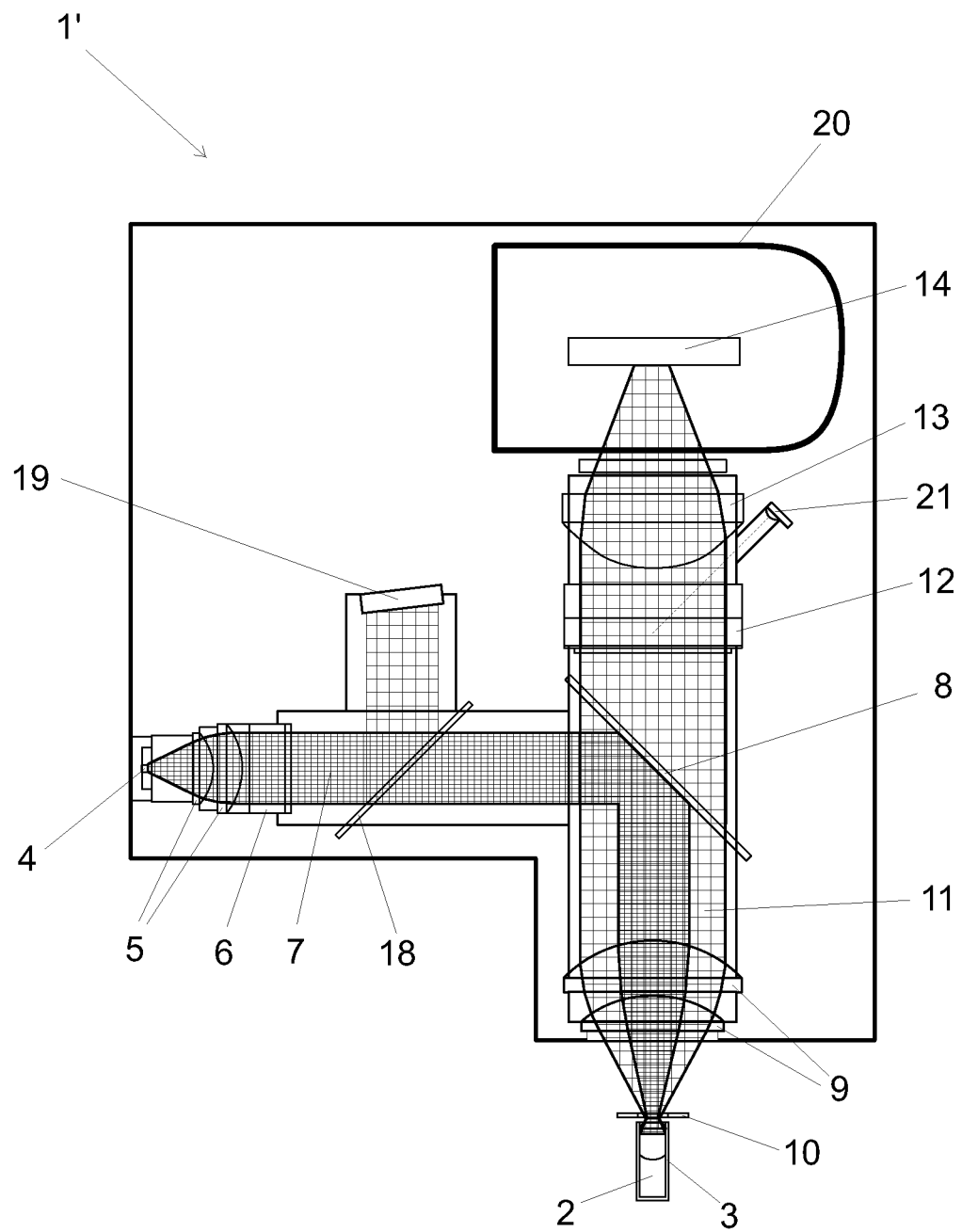
FIG. 4 shows schematically, by way of example, an improved embodiment of the measuring arrangement of FIG. 1, and FIGS. 5A-5C show results of kinetic measurements performed with an instrument according to the present invention.

FIG. 4 shows an improved embodiment of the measuring arrangement of FIG. 1, where the optical measuring device 1' is equipped with calibration systems both for the excitation light and for the emission light.

Instrument reading response is a product of excitation efficiency and emission response. Thus, in this improved embodiment of the present invention the optical measuring device 1' is stabilized by calibrating the excitation efficiency and emission response separately, so that the calibration is divided to two independent calibration processes: the excitation calibration and the emission calibration.

Excitation efficiency is calibrated against short term and long term variations.

Short term variation exists inside excitation light pulse, which is typically 100 ms to 500 ms long, emitted by the power LED 4. These kinds of LEDs are not thermally stable at the required power levels so the excitation light pulse amplitude can change during the pulse time. This will change the accurate timing effect of the generated LED excitation pulse. Excitation pulse shape, i.e., the wavelength range and amount of light produced at each wavelength, must be repeatable to conserve the exact timing, and it is not enough to measure the average or peak excitation optical power of the pulse. The LED output level must be continuously controlled and adjusted within the excitation pulse time to maintain constant effective light output.

In the embodiment of FIG. 4, a beam splitter 18 is located in the excitation light path, which separates a small portion of the excitation beam 7 to an excitation reference detector 19. Output signal from the excitation reference detector 19 is kept constant by controlling and adjusting the current to the LED 4. This controlling and adjusting of the current to the LED 4 can be implemented with a control circuit (not shown) comprising a proportional-integral controller (PI-controller) and a power stage to generate the current to the LED. This excitation calibration system generates accurate constant amplitude excitation light pulse in the optical measuring device 1' of the present invention.

This excitation calibration system also provides long term excitation stability for the excitation light for well to well and plate to plate measurements.

In emission calibration the output variation of the photomultiplier tube 20 with operation time is termed as a drift and these drifts are divided to short term drifts and long term drifts.

These drifts are calibrated by using stable emission reference light source 21. The stable emission reference light source 21 can be a LED, Philips LXML-PR00-0500, for example, which is especially temperature stable. The wavelength of light emitted by the LED is 460 nm. These kinds of LEDs are too powerful emitters for this purpose and the output should be attenuated strongly with a neutral density filter, for example.

In the embodiment of FIG. 4, the emission filter 12 is a rotating emission filter wheel, in which there are places for eight emission filters, a hole for measurement without filter, and a solid section for shutter operation for measurements of emission background signal. In the shutter position there is a white reflective scattering surface, which is illuminated by the emission reference light source 21. During emission calibration the emission filter wheel is turned in the shutter position and the white reflective scattering surface on the emission filter wheel is illuminated with the emission reference light source 21, the scattered reflected light illuminates evenly the cathode 14 of the photomultiplier tube 20, and the calibration level is measured.

For the emission calibration the original photomultiplier tube calibration level may be stored in the optical measurement device 1' during its manufacturing. The emission calibration can be carried out, for example, before every microplate reading, and a correction factor is calculated by comparing the measured calibration result to the stored original photomultiplier tube calibration level value.

The final response of the system is the product of the amount of excitation and emission signals. This is highly important especially in TRF measurements. When the intensity of the light source (emission) is set constant, it is enough to measure the amount of excitation, and no other correction is needed, to define the system response.

The apparatus 1 may be arranged to form the focused image 15 of the LED 4 on top of the opening of a sample well 3 by focusing light of the LED 4. The apparatus 1 may comprise the lens arrangement 9 to provide a focused beam by focusing the light of the LED such that the focused image 15 is formed at the focal point of the focused beam. The numerical aperture (NA) of the lens arrangement 9 may be, e.g., greater than 0.15, greater than 0.20, greater than 0.30, greater than 0.40, greater than 0.50, or even greater than 0.80. Using the large solid angle and focusing the image on top of the opening may provide efficient and uniform illumination of the sample 2 contained in the sample well 3. By using a diffusely reflecting sample well 3 and the large solid angle, the apparatus 1 may be arranged to uniformly illuminate the sample 2 from above, below and sides. The uniform illumination may reduce the risk of photo-bleaching effects.

The opening of the sample well 3 may be slightly displaced (horizontally) with respect to the focal point due to positioning inaccuracies. The uniform illumination may reduce the effect of the horizontal positioning error on the measurement result.

The vertical position of the upper surface of the liquid sample contained in the sample well 3 may also have an effect on the measurement result. In practice, the actual position of the upper surface may slightly deviate from a reference position. The uniform illumination may reduce the effect of said deviation on the measurement result.

The LED may be powered by an electric current coupled to the LED. The ratio of the output intensity of the LED to the electric current may be substantially linear in the vicinity of the operating point of the LED. The LED may be controlled easily by using a current supply. Consequently, the output intensity of the LED may be stabilized easily by controlling the electric current coupled to the LED. The risk of photo-bleaching effects may be further reduced by reducing short term variations inside a single excitation light pulse. The apparatus 1 may be arranged to maintain substantially constant effective light output during a single excitation light pulse. The instantaneous intensity of an excitation light pulse may be controlled by using an excitation reference detector 19 to monitor the intensity of the excitation light pulse. The method may comprise adjusting the electric current to the LED 4 such that an output signal from the excitation reference detector 19 is kept substantially constant during the excitation light pulse. The current to the LED 4 may be generated, e.g., by using a proportional-integral controller (PI-controller) based on the output signal obtained from the excitation reference detector 19. A portion of the light of the excitation light pulse may be optically coupled to the reference detector 19 in order to provide the output signal. Said portion may be optically coupled to the reference detector 19, e.g., by using the beam splitter 18.

The LED 4 may have a light-emitting region which has accurately defined and stable dimensions. The intensity distribution may be spatially substantially uniform on the surface of the light-emitting region. The light-emitting region of the LED 4 may have a substantially planar output surface. The image of the light-emitting region may be focused on top of the opening of a sample well 3. The light-emitting region may have stable length and width so that the position and size of the image of the light-emitting region may also be highly stable. The LED may have a substantially rectangular light-emitting region or a substantially circular light-emitting region, and the sample well 3 may have a substantially rectangular or circular opening. The shape of the light-emitting region may be selected to match the shape of the opening of the sample well 3 (or vice versa).Thus, the shape of the image of the rectangular or circular light-emitting region may match with the shape of the opening of the sample well 3.In an embodiment, the sample wells 3 of a sample plate may be arranged in a rectangular array such that the wells of the plate have substantially rectangular openings and an image of a rectangular light-emitting region may be focused on top of an opening of a well 3 of said well plate.

The LED may provide non-coherent excitation light 7, which may reduce the risk of photo-bleaching effects.

Thanks to the uniform and controlled illumination by using the LED, the photobleaching may have a reduced effect on the intensity of the chemiluminescence light emitted from the sample. The sample may be excited by several successive excitation light pulses so that the intensity of chemiluminescence light detected after the last excitation light pulse of said successive excitation light pulses may still be substantially greater than zero. In particular, the sample may be excited by a first excitation light pulse and by a second excitation light pulse such that the intensity of chemiluminescence light emitted after the second excitation light pulse is greater than 80%, or even greater than 90% of the intensity of chemiluminescence light emitted after the first excitation light pulse, in conditions where the degree of binding in the sample during the excitation light pulses remains the same.

Binding of molecules captured on the beads may have an effect on energy transfer from the singlet oxygen to the acceptor beads. Thus, the intensity and/or energy of the chemiluminescence emission light may be indicative of the degree of binding in the sample. Thanks to the reduced photobleaching, the amount of singlet oxygen molecules generated by the excitation light pulses may remain substantially constant or decrease at a slow rate. This may allow more accurate monitoring of the degree of binding in the sample.

The method may comprise:

illuminating a sample 2 with a first excitation light pulse to generate a first collection of singlet oxygen molecules from donor molecules of the sample 2, causing emission of first chemiluminescence emission light by transferring energy from the first collection of singlet oxygen molecules to acceptor molecules of the sample 2, measuring the first chemiluminescence emission light, illuminating the same sample 2 with a second excitation light pulse to generate a second collection of singlet oxygen molecules from donor molecules of the sample, causing emission of second chemiluminescence emission light by transferring energy from the second collection of singlet oxygen molecules to acceptor molecules of the sample 2, and measuring the second chemiluminescence emission light, wherein the sample 2 is illuminated by the first excitation light pulse and by the second excitation light pulse such that the amount of singlet oxygen molecules generated by the second excitation light pulse is in the range of 80% to 100% of the amount of singlet oxygen molecules generated by the first excitation light pulse.

The method may comprise:

illuminating a sample 2 with a first excitation light pulse to generate a first collection of singlet oxygen molecules from donor molecules of the sample 2, causing emission of first chemiluminescence emission light by transferring energy from the first collection of singlet oxygen molecules to acceptor molecules of the sample 2, measuring the first chemiluminescence emission light, illuminating the same sample 2 with a second excitation light pulse to generate a second collection of singlet oxygen molecules from donor molecules of the sample, causing emission of second chemiluminescence emission light by transferring energy from the second collection of singlet oxygen molecules to acceptor molecules of the sample 2, and measuring the second chemiluminescence emission light, wherein the sample 2 is illuminated by the first excitation light pulse and by the second excitation light pulse such that the maximum intensity of the second chemiluminescence emission light is greater than or equal to 80% of the maximum intensity of the first chemiluminescence emission light, and wherein the degree of binding in the sample during the first excitation light pulse and the second excitation light pulse remains the same.

The method may comprise:

illuminating a sample 2 with a first excitation light pulse to generate a first collection of singlet oxygen molecules from donor molecules of the sample 2, causing emission of first chemiluminescence emission light by transferring energy from the first collection of singlet oxygen molecules to acceptor molecules of the sample 2, measuring the first chemiluminescence emission light, illuminating the same sample 2 with a second excitation light pulse to generate a second collection of singlet oxygen molecules from donor molecules of the sample, causing emission of second chemiluminescence emission light by transferring energy from the second collection of singlet oxygen molecules to acceptor molecules of the sample 2, and measuring the second chemiluminescence emission light, wherein the sample 2 is illuminated by the first excitation light pulse and by the second excitation light pulse such that the maximum intensity of the second chemiluminescence emission light is greater than or equal to 90% of the maximum intensity of the first chemiluminescence emission light, and wherein the degree of binding in the sample during the first excitation light pulse and the second excitation light pulse remains the same.

The maximum intensity of the first excitation light pulse may be substantially equal to the maximum intensity of the second excitation light pulse, and the energy of the first excitation light pulse may be substantially equal to the energy of the second excitation light pulse. The intensity of the excitation light pulse emitted from the LED may also be kept substantially constant during the excitation light pulse. The duration of the light pulses may be selected such that the maximum intensity of the chemiluminescence emission light caused by the second excitation light pulse is, e.g., higher than ten times the minimum detection limit of the apparatus 1. The intensity of the first excitation light pulse and the intensity of the second excitation light pulse may be selected such that the maximum intensity of the chemiluminescence emission light caused by the second excitation light pulse is higher than, e.g., 10 times the minimum detection limit of the apparatus 1. The minimum detection limit may mean the minimum intensity of emission which can be distinguished from the background noise. The magnitude of the intensity may be measured with a reasonable accuracy when the intensity is, e.g., higher than ten times the minimum detection limit.

The intensity of excitation light caused by a first excitation light pulse may be measured during a detection time period, which is between the first excitation light pulse and the second excitation light pulse. The time delay between the end of the first excitation light pulse and the start of the second excitation light pulse may be, e.g., greater than or equal to 30 ms. The time delay may be selected such that the second excitation light pulse does not start before the end of the detection time period used for measuring the chemiluminescence emission caused by the first excitation light pulse. The intensity of the excitation light may be substantially equal to zero during said detection time period. The time delay may be, e.g., greater than 30 ms, greater than 100 ms, greater than 500 ms, greater than 1 s, greater than 10 s, greater than 60 s, greater than 10 min, greater than 1 h, greater than 2 h, greater than 12 h, or even greater than 24 hours. The sample 2 may be illuminated with the second excitation light pulse after the sample has been illuminated with the first excitation light pulse. The maximum intensity of the first excitation light pulse may be substantially equal to the maximum intensity of the second excitation light pulse. The signal obtained from the detector may be optionally integrated, and the detection time period may also be called as the integration time period.

Obtaining chemiluminescence emission light several times from the same sample may provide a more reliable and/or a more accurate measurement result. Obtaining chemiluminescence emission light several times from the same sample may facilitate analysis of time-dependent phenomena.

In an embodiment, the sample may be uniformly illuminated with at least ten successive excitation pulses such that the intensity of the chemiluminescence emission light is substantially greater than zero even after the 10th excitation light pulse. The duration and/or intensity of the excitation light pulses may be selected such that the maximum intensity of the chemiluminescence emission light caused by the 10th excitation pulse may be, e.g., greater than 50% of the maximum intensity of the chemiluminescence emission light caused by the first excitation pulse. The maximum intensity of the emission caused by the 10th excitation pulse may even be greater than 75% of the maximum intensity of the emission caused by the first excitation pulse. The excitation light pulses may have substantially similar intensity and duration.

The excitation wavelength may be, e.g., substantially equal to 680 nm. The LED 4 may be selected such that the peak wavelength of the LED 4 matches with the excitation wavelength, in order to provide maximum efficiency. The LED 4 may be selected such that the peak wavelength of the LED 4 is, e.g., in the range of 675 nm to 685 nm. In particular, the peak wavelength of the LED 4 may be, e.g., substantially equal to 680 nm.

Light received from the sample 2 may comprise, e.g., emitted light 11, reflected light and/or scattered light. The wavelength of a spectral component of the received light may be inside a spectral detection band or outside the spectral detection band. The emission light 11 from the sample 2 may be measured in a spectrally selective manner such that spectral components outside the detection band are not transmitted to the detector 20. The emission light 11 may be measured in a spectrally selective manner such that spectral components outside the detection band are not detected by the detector 20. In particular, the detection band may be selected such that the wavelength (e.g., 680 nm) of the excitation light is outside the detection band. The detector 20 of the apparatus 1 may be arranged to detect those spectral components of the received light whose wavelengths are inside the detection band, and the apparatus 1 may be arranged to prevent propagation of those spectral components of the received light whose wavelengths are outside the detection band. The spectral detection band is a wavelength range defined by a first cut-off wavelength and a second cut-off wavelength. The first cut-off wavelength of the detection band may be, e.g., longer than or equal to 520 nm, and the second cut-off wavelength of the detection band may be, e.g., shorter than or equal to 620 nm. The detection band may be selected such that the detector 20 may detect the chemiluminescence emission light 11, and such that propagation of the excitation light 7 to the detector 20 may be substantially prevented. The apparatus 1 may comprise one or more spectrally selective components to define the detection band. The detection band may be defined, e.g., by using a dichroic beam splitter 8 and/or by using one or more filters.

The method may be a bead-based proximity assay, where Donor beads and Acceptor beads may be connected through one or more biological analyte materials, which may specifically react with each other and/or with the beads. When the Donor beads are excited with a red laser light at 670-690 nm wavelength (e.g., at the wavelength 680 nm), they may convert ambient oxygen to an excited singlet state. The released singlets of oxygen may diffuse to the surrounding sample well matrix. If the Donor and Acceptor beads are connected via the specific biological reaction to be examined, the Acceptor beads may be near enough to be excited by the singlets, and a light emission may be produced. The wavelengths of the emitted light may be, e.g., in the range of 520-620 nm. The wavelengths in the range of 520-620 nm may correspond to., e.g., blue-green, green or yellow light. The emission of light may be proportional to the level of interaction. By measuring the emission light, it may be possible to establish how effectively the chemical reaction has taken place and/or what the properties of the sample being assayed are.

Transfer of energy from singlet oxygen to the acceptor beads may take some time, and the signal-to-noise ratio of the measurement may be improved when there is a time delay between the end of an excitation light pulse and measuring the chemiluminescence caused by said excitation light pulse. More precisely, said time delay may mean the time period between the end of an excitation light pulse and the start of the detection time period used for measuring the chemiluminescence emission caused by said excitation light pulse. The length of the time delay may be, e.g., greater than 1 ms. The length of the time delay may be, e.g., substantially equal to 50 ms. The measurement of emission light 11 may be carried out after a predefined time period has passed from the sending of the excitation light impulse, wherein the predefined time period may be, e.g., longer than 1 ms.

The disturbing background caused by conventional fluorescence may be substantially reduced or eliminated by using the excitation wavelength which is longer than the second cut-off wavelength of the detection band. The measurement of the chemiluminescence light may be spectrally separate from the excitation light pulse in order to reduce the background. The measurement of the chemiluminescence light may be temporally separate from fluorescence light emitted from the sample 2 and/or from the well 3, e.g., by 50 ms. When measuring the chemiluminescence emission caused by the singlet oxygen, the excitation wavelength may be longer than the second cut-off wavelength of the detection band. The wavelengths of background fluorescence emission may be longer than the excitation wavelength. Consequently, the detection band used for measuring the chemiluminescence emission may be selected such that the detection band does not spectrally overlap the fluorescence emission.

The instantaneous signal obtained from the emission detector 20 may be substantially proportional to the instantaneous intensity of the chemiluminescence emission light 11. An integral of the instantaneous signal obtained from the emission detector 20 after a single excitation light pulse may be substantially proportional to the integral of the intensity of the chemiluminescence emission light 11 emitted from the sample during an integration time period after said single excitation light pulse. The apparatus 1 may be arranged to provide the integral of the instantaneous signal obtained from the emission detector. The integral may be indicative of the AlphaScreen signal. The integral may be optionally normalized by using the energy or intensity of the excitation light pulse. The integral may be optionally divided by the length of the integration time period in order to provide an average value. The values of two or more integrals may be optionally summed or averaged in order to improve measurement accuracy.

The emission detector 20 may be calibrated by using the emission reference light source and a scattering surface. The scattering surface may be arranged to temporarily reflect light of the reference light source to the emission detector 20. The light reflected from the scattering surface may be optically coupled to the emission detector 20 in order to calibrate the response of the emission detector 20. The scattering surface may be, e.g., a white scattering surface or a grey scattering surface. The detector 20 may be calibrated for weak signals by using a grey scattering surface. The dynamic range of the emission detector 20 may be calibrated by using two or more scattering surfaces, which have different shades.

EXAMPLE 1

Long time kinetic measurement of AlphaScreen signal was performed using AlphaScreen Phosphotyrosine (PT66) Detection Kit from Perkin Elmer (Product No. 6760602M).

In this assay, AlphaScreen donor and acceptor beads are bound together with biotinylated phoshopeptide. This forms the AlphaScreen complex where donor and acceptor beads are in close proximity which generates Alphascreen signal via singlet Oxygen mechanism. Therefore, measured AlphaScreen signal in this assay is directly proportional to the amount of the biotinylated LCK-P peptide.

The test for kinetic AlphaScreen assay was performed with 384 well Alphaplate (Product No. 6005359), Perkin Elmer, using 25 µl total volume. Donor and acceptor beads were mixed as instructed by the manufacturer. Then, 15 µl of bead mixture and 10 µl of different concentrations of biotinylated LCK-P peptide was added into the microplate wells to a final concentration of 0.5, 1.5, 5, 15 and 50 fmol/well. Peptide dilutions were measured using eight replicate wells and buffer blank was included with 16 replicates. The assay plate was incubated at dark in room temperature for one hour after which the plate was measured at room temperature with the instrument according to the present invention. Measurement settings were: Excitation wavelength 680 nm, Emission wavelength 570 nm, Excitation time 300 ms, Delay time 40 ms and Integration time 300 ms. Measurement was performed in kinetic format once in every two hours for a total time of 22 hours.

Figure 5A:
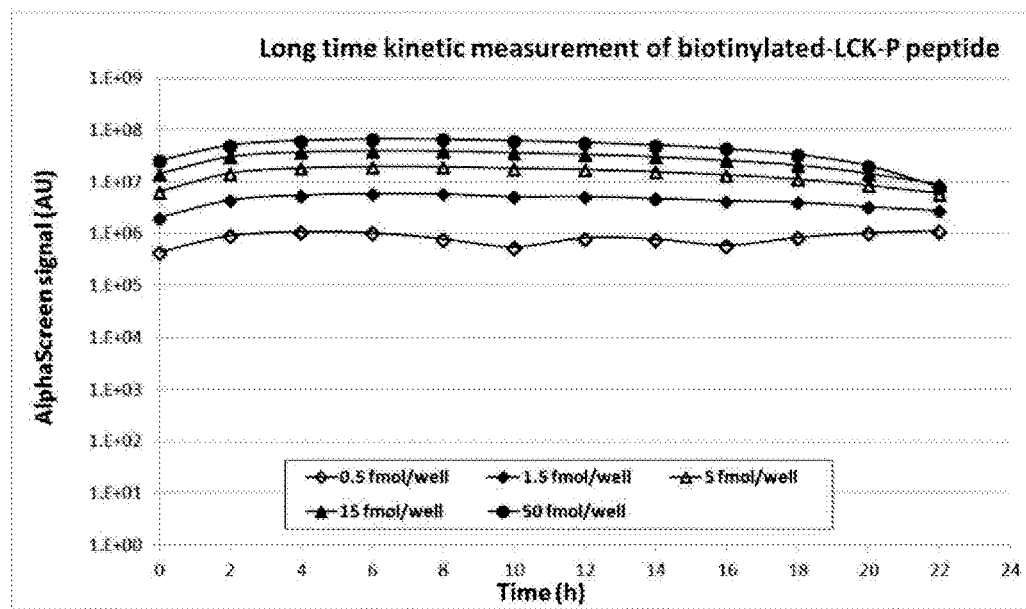

The results of this long time kinetic measurement of Alphascreen signal with biotinylated peptide are shown in FIG. 5A.

EXAMPLE 2

Short time kinetic stability of AlphaScreen measurement was tested using the same assay as in Example 1. 0.5 fmol/well of biotinylated peptide was incubated with AlphaScreen beads (8 replicates) for two minutes and the Alphascreen signal was measured with the instrument according to the present invention using the same instrument settings as above. The measurement was repeated 20 times with six seconds interval.

Figure 5B:
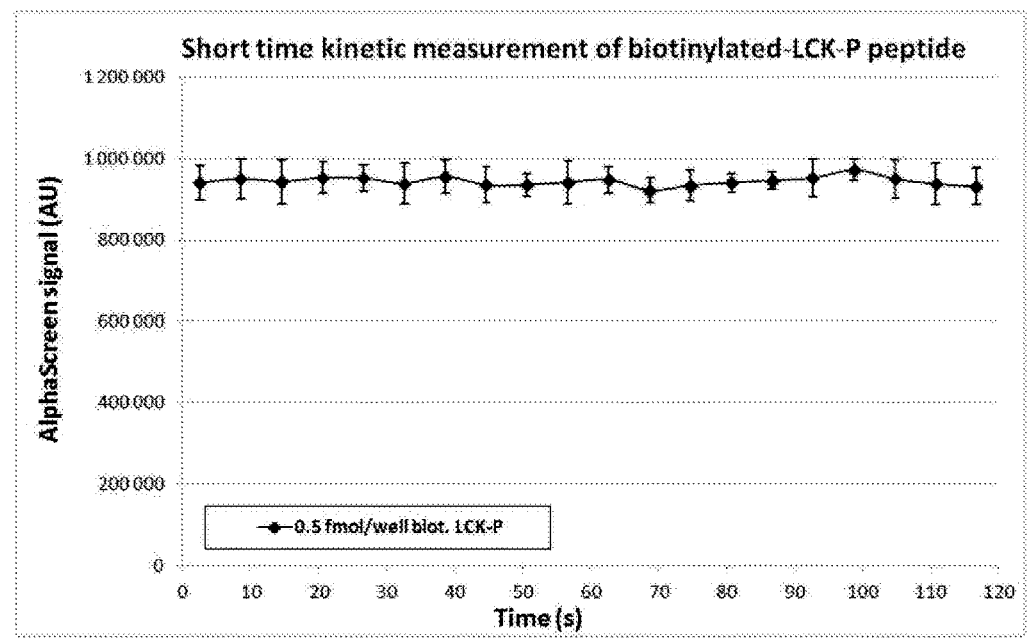

The results of this short time kinetic measurement of Alphascreen signal with biotinylated peptide are shown in FIG. 5B.

EXAMPLE 3

Omnibeads are a special type of AlphaScreen beads that have been designed for verification and calibration of instruments used in AlphaScreen technology (Perkin Elmer, Prod. No. 6760626M). Omnibeads contain only a single type of bead that generates a strong AlphaScreen signal.

In this assay, Omnibeads were diluted with 10 mM PBS buffer, pH 7.2 and 25 µl of each dilution was added into 384-well Alphaplate with eight replicates. A kinetic measurement was started immediately after pipetting and the assay plate was measured with the instrument of the present invention once in every 30 min for 12 hours using room temperature. Measurement settings were as above: Excitation wavelength 680 nm, Emission wavelength 570 nm, Excitation time 300 ms, Delay time 40 ms and Integration time 300 ms.

Figure 5C:
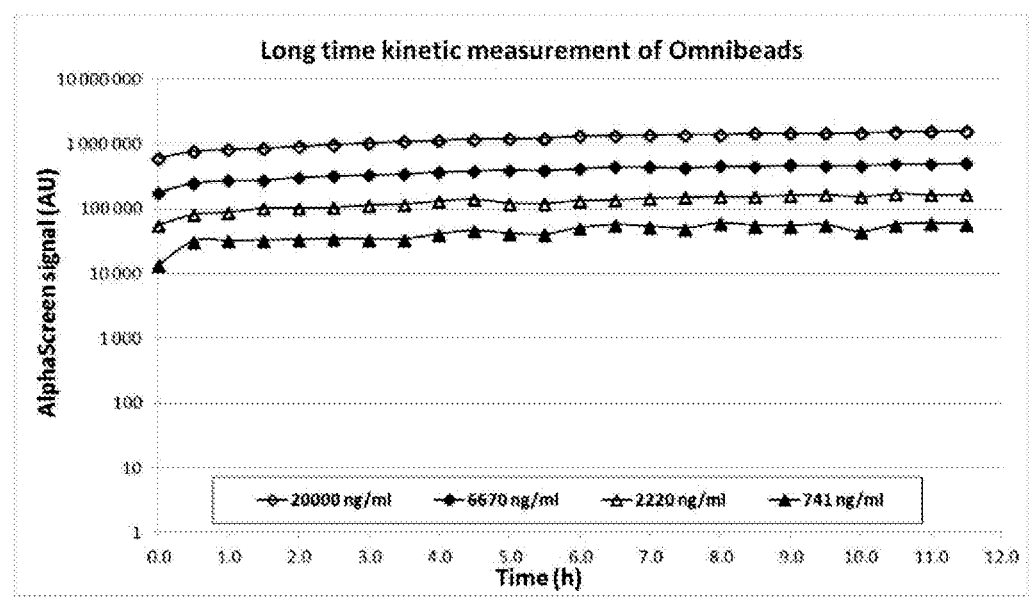

The results of this long time kinetic measurement of AlphaScreen signal with Omnibead calibration beads are shown in FIG. 5C.

As can be seen from FIGS. 5A-5C, the results of the example measurements remained quite constant in the TRF-measurement series.

The specific exemplifying embodiments of the present invention shown in the figures and discussed above should not be construed as limiting. A person skilled in the art can amend and modify the embodiments in many evident ways within the scope of the attached claims. Thus, the present invention is not limited merely to the embodiments described above.

What is claimed is:

1. A method for optical measurement of a liquid sample placed in a sample well where the sample in the sample well is exposed to excitation light at first wavelength from an excitation light source, which excitation light generates a collection of singlet state oxygen molecules from donor molecules in the liquid sample, said singlet state oxygen molecules reacting with acceptor molecules in the liquid sample causing said acceptor molecules to emit chemiluminescence emission light at second wavelength, which second wavelength is shorter than said first wavelength, and where the emission light produced by the excitation light is measured with a detector, wherein the excitation light source is a LED, and wherein the method comprises forming a focused image of the LED on top of an opening of the sample well.

2. The method according to claim 1, wherein the excitation light from the LED is focused on the area of the opening of the sample well, and the emission light is collected from the area of the opening of the sample well with confocal arrangement.

3. The method according to claim 1, wherein the excitation light is guided into the sample well and the emission light is collected from the sample well in confocal arrangement, where the image of the excitation light source is focused on the top of the opening of the sample well, and the image of the light receiving area of the detector is focused on top of the opening of the sample well.

4. The method according to claim 3, wherein said image of the excitation light source is smaller than the opening of the sample well.

5. The method according to claim 3, wherein said image of the light receiving area of the detector is larger than the opening of the sample well.

6. The method according to claim 1, wherein an excitation light impulse is sent to the sample, and the measurement of emission light is carried out after a predefined time period has passed from the sending of the excitation light impulse.

7. The method of claim 6 wherein said predefined time period is longer than 1 ms.

8. The method according to claim 1, wherein the excitation light and emission light are calibrated with separate and independent calibration processes.

9. The method according to claim 1, comprising:
coupling a portion of the excitation light pulse to an excitation reference detector, and
adjusting the electric current to the LED based on an output of the excitation reference detector such that the output signal from the excitation reference detector is kept substantially constant during said excitation light pulse.

10. The method of claim 9 comprising providing the current to the LED by using a proportional-integral controller.

11. The method according to claim 1, wherein the LED emits light at the wavelength of 680 nm.

12. The method according to claim 1 wherein the peak wavelength of the LED is in the range of 675 nm to 685 nm.

13. The method according to claim 1, wherein the emission light is measured in a spectrally selective manner such that spectral components outside a detection band are not transmitted to the detector, the first wavelength of the excitation light source is outside the detection band, a first cut-off wavelength of the detection band of the apparatus is longer than or equal to 520 nm, and a second cut-off wavelength of the detection band is shorter than or equal to 620 nm.

14. The method according to claim 1, wherein the sample is excited and the corresponding emission is read at least two times.

15. The method according to claim 1, comprising:
illuminating the sample with a first excitation light pulse to generate a first collection of singlet oxygen molecules from donor molecules of the sample,
causing emission of first chemiluminescence emission light by transferring energy from the first collection of singlet oxygen molecules to acceptor molecules of the sample,
measuring the first chemiluminescence emission light,
illuminating the sample with a second excitation light pulse to generate a second collection of singlet oxygen molecules from donor molecules of the sample,
causing emission of second chemiluminescence emission light by transferring energy from the second collection of singlet oxygen molecules to acceptor molecules of the sample, and
measuring the second chemiluminescence emission light,
wherein the sample is illuminated by the first excitation light pulse and by the second excitation light pulse such that the maximum intensity of the second chemiluminescence emission light is greater than or equal to 80% of the maximum intensity of the first chemiluminescence emission light, and wherein the time delay between the end of the first excitation light pulse and the second excitation light pulse is greater than 30 ms.

16. The method according to claim 1, comprising using a lens arrangement to provide a focused beam by focusing the light of the LED such that the focused image of the LED is formed at the focal point of the focused beam, wherein the numerical aperture of the lens arrangement is greater than 0.20.

17. An apparatus for optical measurement of a liquid sample placed in a sample well, which apparatus comprises an excitation light source for exposing the sample in the sample well to excitation light at first wavelength, and a detector for detecting and measuring a corresponding chemiluminescence emission light at second wavelength from the sample, which second wavelength is shorter than said first wavelength, wherein the excitation light source is a LED, and wherein the apparatus is arranged to form a focused image of the LED on top of an opening of the sample well.

18. An apparatus according to claim 17, wherein the apparatus comprises focusing devices for focusing the image of the excitation light source on top of the opening of the sample well, and devices for focusing the image of the light receiving area of the detector in the area of the opening of the sample well.

19. An apparatus according to claim 17, wherein the excitation light source is an impulse excitation light source.

20. An apparatus according to claim 17, wherein the apparatus comprises an excitation light filter, an emission light filter, excitation and emission light beam splitter, and a stray light shield above the sample well.

21. An apparatus according to claim 17, wherein the apparatus comprises an excitation light beam splitter and an excitation reference detector for calibrating the excitation light, and/or emission reference light source and a white reflective scattering surface for calibrating the emission detector.

22. An apparatus according to claim 17, wherein the LED is a LED emitting light at the wavelength of 680 nm.

23. An apparatus according to claim 17, wherein the detector is a photomultiplier tube.

* * * * *